United States Patent
Kitada et al.

(10) Patent No.: US 9,891,772 B2
(45) Date of Patent: Feb. 13, 2018

(54) TOUCH INPUT DEVICE AND DISPLAY DEVICE

(71) Applicant: Murata Manufacturing Co., Ltd., Nagaokakyo-shi, Kyoto-fu (JP)

(72) Inventors: Hiroaki Kitada, Nagaokakyo (JP); Takafumi Inoue, Nagaokakyo (JP); Hidekazu Kano, Nagaokakyo (JP)

(73) Assignee: MURATA MANUFACTURING CO., LTD., Nagaokakyo-shi, Kyoto-fu (JP)

( * ) Notice: Subject to any disclaimer, the term of this patent is extended or adjusted under 35 U.S.C. 154(b) by 335 days.

(21) Appl. No.: 14/876,391

(22) Filed: Oct. 6, 2015

(65) Prior Publication Data

US 2016/0026299 A1    Jan. 28, 2016

Related U.S. Application Data

(63) Continuation of application No. PCT/JP2014/064062, filed on May 28, 2014.

(30) Foreign Application Priority Data

May 29, 2013   (JP) .................................. 2013-112428

(51) Int. Cl.
*G06F 3/045*   (2006.01)
*G06F 3/044*   (2006.01)
(Continued)

(52) U.S. Cl.
CPC .............. *G06F 3/044* (2013.01); *G06F 3/016* (2013.01); *G06F 3/0412* (2013.01);
(Continued)

(58) Field of Classification Search
CPC ........ G06F 3/044; G06F 3/016; G06F 3/0412; G06F 3/04103; G06F 3/04105
(Continued)

(56) References Cited

U.S. PATENT DOCUMENTS

| | | | |
|---|---|---|---|
| 2009/0002199 A1* | 1/2009 | Lainonen | G06F 3/0414 341/20 |
| 2012/0038583 A1 | 2/2012 | Westhues et al. | |

(Continued)

FOREIGN PATENT DOCUMENTS

| | | |
|---|---|---|
| JP | 2005-213376 A | 8/2005 |
| JP | 2010-108490 A | 5/2010 |

(Continued)

OTHER PUBLICATIONS

International Search Report for PCT/JP2014/064062, dated Jul. 15, 2014.

*Primary Examiner* — Jonathan Blancha
(74) *Attorney, Agent, or Firm* — Arent Fox LLP

(57) ABSTRACT

A touch input device that includes a touch sensor and a control unit. The touch sensor includes a base material, a piezoelectric film, a plurality of first detecting conductors and a plurality of second detecting conductors. The base material is a flat plate. The piezoelectric film is made of uniaxially stretched PLLA, and is arranged on one principal surface of the base material. The first detecting conductors are arranged on a surface of the piezoelectric film opposite to the base material. The plurality of second detecting conductors are arranged on a surface opposite to the surface of the base material which abuts on the piezoelectric film. The control unit detects an operation position and a press by using detection signals outputted from the first detecting conductors and the second detecting conductors.

17 Claims, 5 Drawing Sheets

(51) Int. Cl.
 *G06F 3/01* (2006.01)
 *G06F 3/041* (2006.01)
(52) U.S. Cl.
 CPC .. *G06F 3/0414* (2013.01); *G06F 2203/04103* (2013.01); *G06F 2203/04105* (2013.01)
(58) Field of Classification Search
 USPC ......................................................... 345/174
 See application file for complete search history.

(56) References Cited

U.S. PATENT DOCUMENTS

| | | | |
|---|---|---|---|
| 2012/0169619 A1* | 7/2012 | Golovchenko | G06F 3/0418 345/173 |
| 2013/0082970 A1* | 4/2013 | Frey | G06F 3/0414 345/173 |
| 2014/0152618 A1 | 6/2014 | Ando | |
| 2016/0091919 A1* | 3/2016 | Takeda | G06F 3/03 345/174 |

FOREIGN PATENT DOCUMENTS

| | | |
|---|---|---|
| WO | WO 2012/024254 A2 | 2/2012 |
| WO | WO 2013/021835 A1 | 2/2013 |

\* cited by examiner

TOUCH INPUT DEVICE AND DISPLAY DEVICE

CROSS REFERENCE TO RELATED APPLICATIONS

The present application is a continuation of International application No. PCT/JP2014/064062, filed May 28, 2014, which claims priority to Japanese Patent Application No. 2013-112428, filed May 29, 2013, the entire contents of each of which are incorporated herein by reference.

FIELD OF THE INVENTION

The present invention relates to a touch input device which includes a touch sensor which detects a touched position on an operation surface and detects a pressing amount with respect to the operation surface, and a display device.

BACKGROUND OF THE INVENTION

Conventionally, various touch input devices which each detect an operation input when an operator touches an operation surface are devised. The touch input devices include a touch input device which detects a touched position on an operation surface and detects a press on or a pressing amount with respect to an operation surface.

For example, the touch input device described in Patent Literature 1 adopts a structure obtained by overlapping a pressure-sensitive sensor of a flat shape (pressing sensor) and a touch panel of a flat shape. The pressure-sensitive sensor detects a pressing amount, and the touch panel detects an operation position.

PTL 1: Japanese Patent Application Laid-Open No. 2010-108490

SUMMARY OF THE INVENTION

However, the conventional touch input devices each adopt a structure that the pressing sensor of the flat shape and the touch panel (position detecting sensor) of the flat shape adopting independent structures are simply overlapped. Hence, a touch sensor which detects an operation position and a press has the thickness including at least the thickness of the pressing sensor and the thickness of the operation position detecting sensor. Hence, there is a problem that the thickness of the entire touch input device becomes thick.

It is therefore an object of the present invention to provide a touch input device which can detect an operation position and a press and is thinner than a conventional configuration.

Further, features of the touch input device according to the present invention include employing the following configuration. The touch input device includes a touch sensor and a control unit. The touch sensor includes a piezoelectric film and first and second detecting conductors. A plurality of first detecting conductors are arranged on one side surface of the piezoelectric film. A plurality of second detecting conductors are arranged on a surface opposite to the one side surface of the piezoelectric film such that at least part of the plurality of second detecting conductors face the first detecting conductors, respectively.

Each of the first detecting conductors and the second detecting conductors has an elongated shape and is arranged in a direction orthogonal to an elongation direction. The control unit detects an operation position and a press by using detection signals outputted from the plurality of first detecting conductors and the plurality of second detecting conductors. The control unit sets a side of each of the second detecting conductors as a reference potential upon the detection of the press.

According to this configuration, the control unit detects the operation position and the press by using the detection signals outputted from the first detecting conductors and the second detecting conductors. That is, it is possible to use the first detecting conductors and the second detecting conductors to detect an operation position and a press, and individually detect a press and an operation position.

Further, in the touch input device according to the present invention, the piezoelectric film is preferably made of polylactic acid stretched in a uniaxial direction.

According to this configuration, it is possible to improve a press detection sensitivity, and detect displacement caused by a press with a high sensitivity without being influenced by surrounding environment.

Further, when detecting the press, the control unit of the touch input device according to the present invention preferably removes an electric charge charged to each of the second detecting conductors.

According to this configuration, it is possible to detect the press more accurately.

Further, the touch input device according to the present invention preferably includes an impedance adjusting circuit between each of the first detecting conductors and a ground potential.

According to this configuration, it is possible to set each of the first detecting conductors as the ground potential at a specific frequency set by the impedance adjusting circuit. Consequently, it is possible to suppress noise upon detection of an operation position, and more accurately detect the operation position.

Further, in the touch input device according to the present invention, the impedance adjusting circuit is preferably a capacitor which connects each of the first detecting conductors and the ground potential.

According to this configuration, it is possible to suppress noise upon detection of an operation position without inhibiting press detection. Further, a circuit configuration of the impedance adjusting circuit becomes simple.

Further, in the touch input device according to the present invention, the capacitor includes a capacitance whose frequency higher than a frequency of the detection signal is set to a resonance frequency by a serial circuit between the capacitor and each of the first detecting conductors. This configuration indicates a specific aspect of the capacitor.

Further, features of the display device according to the present invention include employing the following configuration. The display device includes the touch input device described above, a display panel which is overlapped on the touch input device to display an image, and a display driving unit which drives the display panel. A frequency of a signal generated by the display driving unit is a resonance frequency.

According to this configuration, the signal generated by the display driving unit flows to the ground connected to the touch sensor. Consequently, it is possible to suppress an influence on a detection result of the signal generated by the display driving unit.

Further, the display device according to the present invention may employ the following configuration. The display device includes a front-end unit which transmits and receives a high frequency signal. A frequency of a signal to be transmitted to the front-end unit is the resonance frequency.

According to this configuration, the signal transmitted by the front-end unit flows to the ground connected to the touch sensor. Consequently, it is possible to suppress an influence on a detection result of the signal transmitted by the front-end unit.

According to the present invention, it is possible to realize a touch input device which can detect an operation position and a press and is thinner than a conventional configuration.

DETAILED DESCRIPTION OF THE INVENTION

Figure 1:
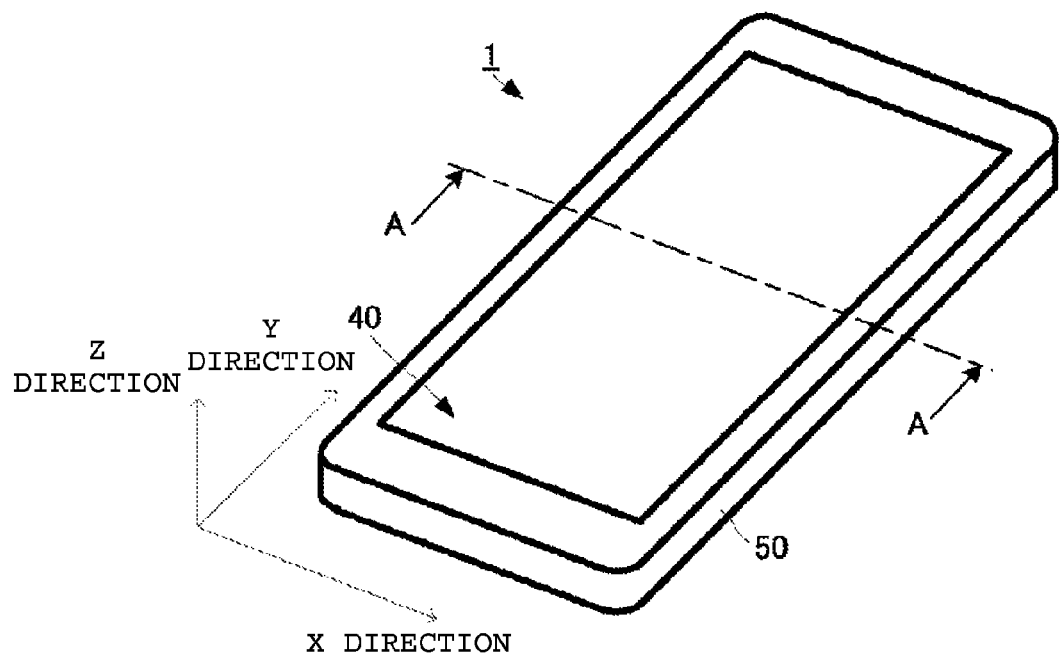
FIG. 1 is an external appearance perspective view of a display device according to a first embodiment of the present invention.
Figure 2:
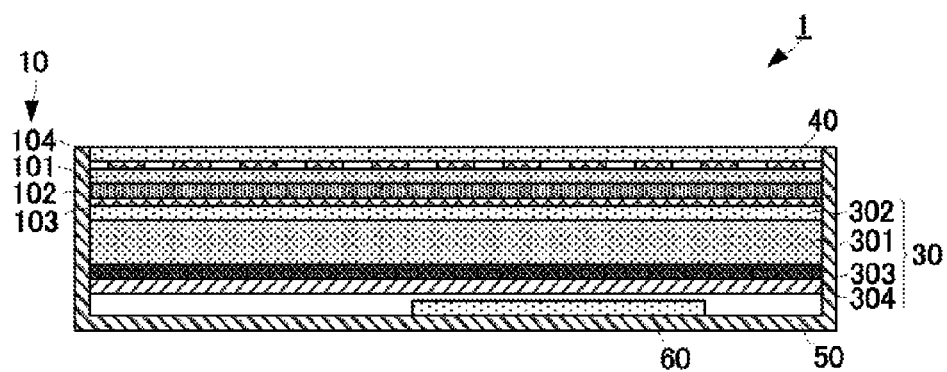
FIG. 2 is a side sectional view illustrating a configuration of the display device according to the first embodiment of the present invention.
Figure 3:
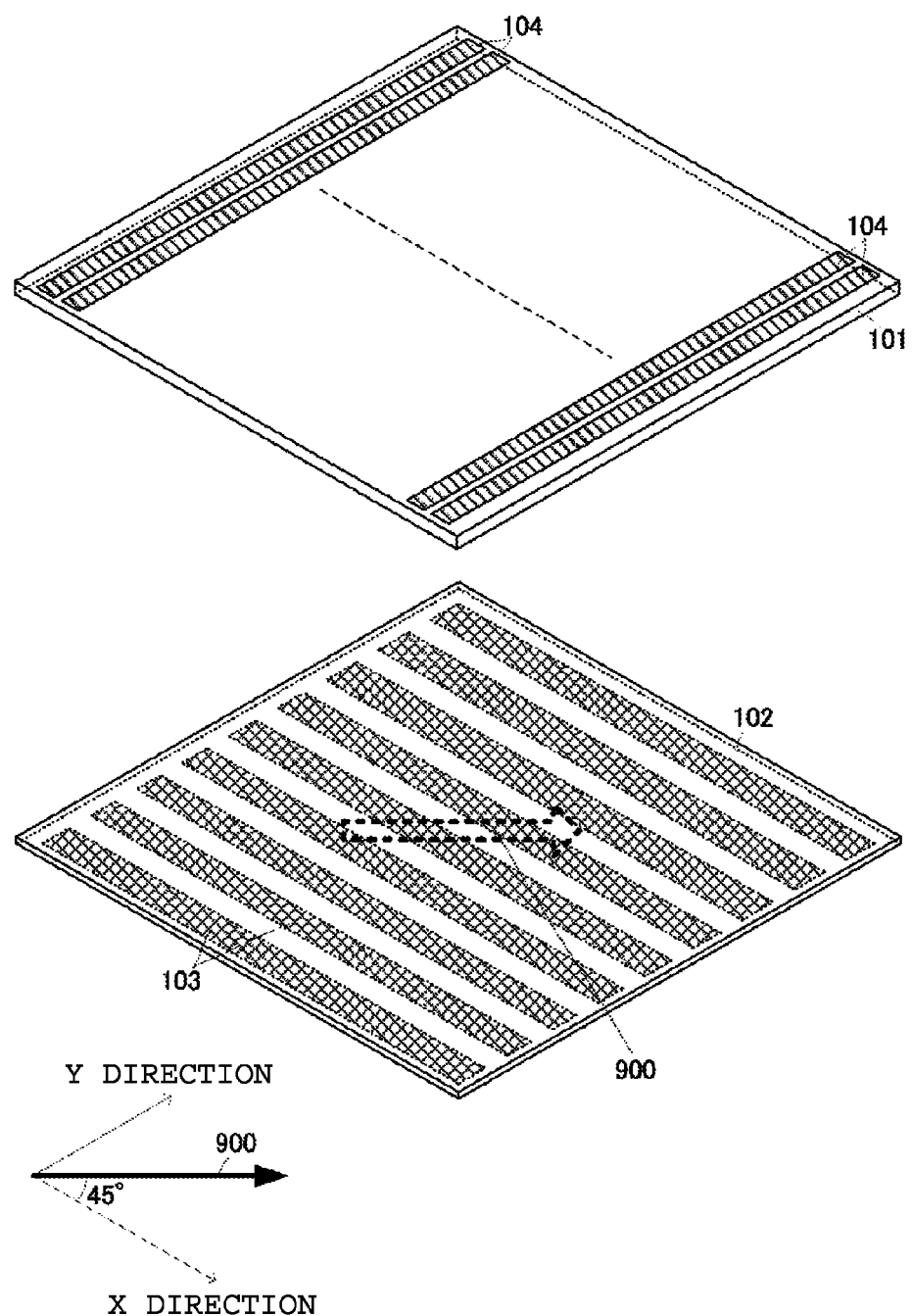
FIG. 3 is an exploded perspective view of a touch sensor according to the first embodiment of the present invention.
Figure 4:
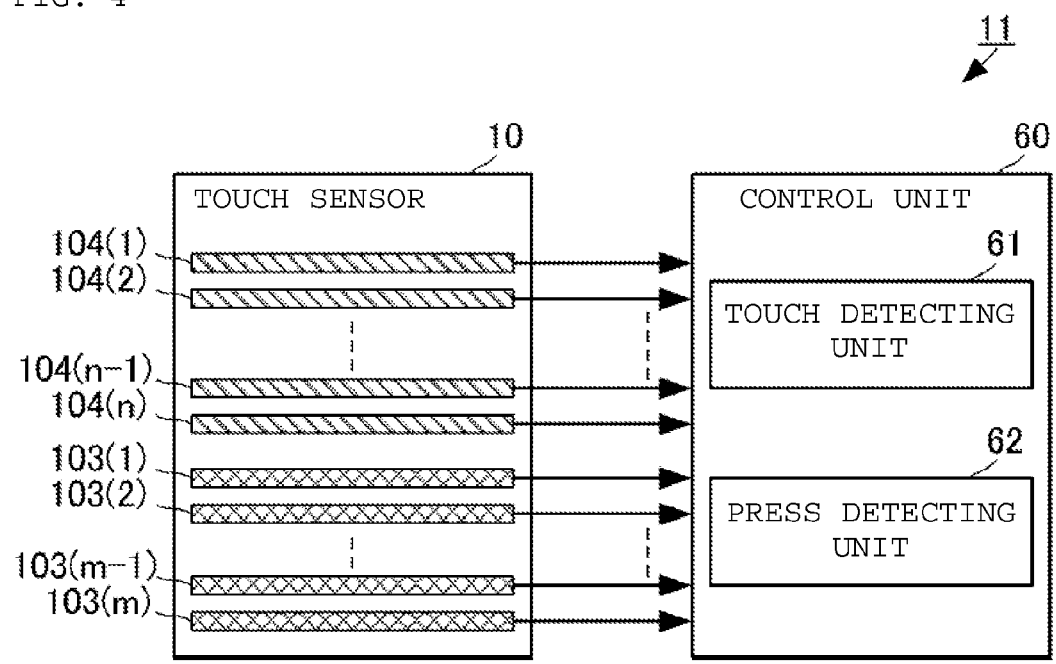
FIG. 4 is a functional block diagram of the touch input device according to the first embodiment of the present invention.

A display device, and a touch sensor and a touch input device provided to the display device according to the first embodiment of the present invention will be described with reference to the drawings. FIG. 1 is an external appearance perspective view of the display device according to the first embodiment of the present invention. FIG. 2 is a side sectional view illustrating a configuration of the display device according to the first embodiment of the present invention. FIG. 3 is an exploded perspective view of the touch sensor according to the first embodiment of the present invention. FIG. 4 is a functional block diagram of the touch input device according to the first embodiment of the present invention.

As illustrated in FIG. 1, a display device 1 includes a housing 50 of a substantially cubic shape. A top surface side of the housing 50 is opened. In addition, in the following description, a width direction (horizontal direction) of the housing 50 is an X direction, a length direction (vertical direction) is a Y direction and a thickness direction is a Z direction. Further, a case where an X direction length of the housing 50 is shorter than a Y direction length of the housing 50 will be described in the present embodiment. However, the X direction and Y direction lengths may be the same or the X direction length may be longer than the Y direction length.

As illustrated in FIG. 2, in the housing 50, a touch sensor 10, a display panel 30, and a control unit 60 having an arithmetic operation circuit module are arranged. The touch panel 10, the display panel 30 and the control unit 60 are arranged in order from an opening surface (display surface) side of the housing 50 and along the Z direction. The touch sensor 10 and the control unit 60 compose the touch input device 11.

As illustrated in FIGS. 2 and 3, the touch sensor 10 includes a base material 101, a piezoelectric film 102, first detecting conductors 103 and second detecting conductors 104.

The base material 101 is made of an insulating material of a rectangular flat shape, and is made of a material having translucency. The base material 101 is made of, for example, PMMA (acrylic resin).

The piezoelectric film 102 has a rectangular shape, and is arranged in a shape over a substantially entire surface of one principal surface (flat surface) of the base material 101.

The piezoelectric film 102 is a film made of chiral polymer. In the present embodiment, polylactic acid (PLA) and, more particularly, poly-L-lactic acid (PLLA) are used for chiral polymer. The PLLA is uniaxially stretched as illustrated in FIG. 2. A uniaxial stretching direction 900 forms nearly 45° in two orthogonal sides (an X direction side and a Y direction side) which form a rectangular shape. In addition, the angle formed by the uniaxial stretching direction 900 is optionally adjusted and is most preferably 45° when the touch sensor 10 is fixed only at both X direction ends of the housing 50 or only at both Y direction ends.

A main chain of the PLLA made of chiral polymer adopts a helical structure. The PLLA is uniaxially stretched and has piezoelectricity when molecules are oriented. Further, the uniaxially stretched PLLA produces electric charges when the flat film surface of the piezoelectric film is pressed. In this regard, the electric charge amount to be produced depends on a displacement amount of displacement of a flat surface caused by a pressing amount (pushing amount) in a direction orthogonal to the flat surface.

A piezoelectric constant of the uniaxially stretched PLLA is very high among polymers. Consequently, it is possible to reliably detect displacement caused by a press with a high sensitivity.

In addition, a stretching rate is suitably about 3 to 8 fold. Performing heating processing after the stretching encourages crystallization of extended chain crystal of polylactic acid, and a piezoelectric constant improves. In addition, by varying stretching rates of axes when biaxial stretching is performed, it is possible to obtain the same effect as that of uniaxial stretching. When, for example, stretching is performed eight times in a first axis direction and stretching is performed two times in a second axis direction orthogonal to the first axis direction, it is possible to obtain for the piezoelectric constant a substantially equivalent effect as that of a case where uniaxial stretching is performed four times in the first axis direction. That is, the above uniaxial stretching direction means the most stretched direction while also meaning a case where the piezoelectric film is stretched in a plurality of directions. Further, a simply uniaxially stretched film is easily broken in a stretching axis direction, so that it is possible to increase the strength to some degree by performing the above biaxially stretching.

Furthermore, the PLLA produces piezoelectricity as a result of molecule orientation processing such as stretching, and does not require polling processing unlike other polymers such as PVDF or piezoelectric ceramics. That is, piezoelectricity of PLLA which does not belong to ferroelectrics does not appear due to ion polarization like ferroelectrics such as PVDF or PZT, and derives from a helical structure which is a characteristics structure of molecules. Hence, the PLLA does not produce pyroelectricity produced in piezoelectric bodies of other ferroelectrics. Further, PVDF or the like temporarily shows a fluctuation of a piezoelectric constant and the piezoelectric constant is remarkably low depending on cases. However, the piezoelectric constant of PLLA is temporarily very stable. Consequently, it is possible to detect displacement caused by a press with a high sensitivity without being influenced by surrounding environment.

Each first detecting conductor 103 has an elongated shape, and is arranged on a surface opposite to a side of the piezoelectric film 102 which abuts on the base material 101. A plurality of first detecting conductors 103 are aligned at intervals along a direction orthogonal to the elongation direction. Each first detecting conductor 103 may be provided in a form having a shape over a substantially entire principal surface of the piezoelectric film 102.

For the first detecting conductors 103, using one of inorganic electrodes such as ITO, ZnO, silver nanowires, carbon nanotubes or graphene and organic electrodes whose main components are polythiophene or polyaniline is preferable. By using these materials, it is possible to form a conductor pattern with high translucency.

Each second detecting conductor 104 has an elongated shape, and is arranged on a surface opposite to a surface of the base material 101 which abuts on the piezoelectric film 102. A plurality of second detecting conductors 104 are aligned at intervals along a direction orthogonal to the elongation direction. A plurality of second detecting conductors 104 are arranged to cover a substantially entire principal surface of the base material 101. In this regard, the second detecting conductors 104 are arranged such that at least part of the second detecting conductors 104 face the first detecting conductors 103. The elongation direction of the second detecting conductors 104 is orthogonal to the elongation direction of the first detecting conductors 103.

In addition, on the surfaces of the second detecting conductors 104 opposite to the base material 101 and on the substantially entire principal surface of the base material 101, an insulating protection film 40 is arranged. This protection film 40 is an outermost layer of the opening surface of the housing 50, and a surface of the protection film 40 functions as an operation surface of the display device 1 and the touch input device 11.

According to this configuration, a structure that the base material 101 and the piezoelectric film 102 are arranged between the first detecting conductors 103 and a plurality of second detecting conductors 104.

Hence, when an operator's finger or the like presses the operation surface, the flat surface of the piezoelectric film 102 is curved and electric charges are produced. The first detecting conductors 103 and the second detecting conductors 104 detect the electric charges produced in this way as a potential difference. It is possible to obtain a detection signal for detecting a press.

Further, when the operator's finger or the like touches the operation surface, a capacitance formed at an intersection of the first detecting electrode 103 and the second detecting electrode 104 positioned at a touched position and at surroundings of the touched position changes. Consequently, it is possible to obtain a signal for detecting a position based on a change in a signal propagation state between the first detecting electrode 103 and the second detecting electrode 104.

The display panel 30 is formed as a so-called flat display, and is more specifically formed as a liquid crystal display element. The display panel 30 includes a liquid crystal panel 301, a top surface polarizing plate 302, a back surface polarizing plate 303 and a backlight 304. The top surface polarizing plate 302 and the back surface polarizing plate 303 are arranged sandwiching the liquid crystal panel 301.

The backlight 304 is arranged on a side opposite to the liquid crystal panel 301 across the back surface polarizing plate 303.

The control unit 60 having the arithmetic operation circuit module is arranged on a back surface side of the display panel 30. More specifically, a mounting substrate (not illustrated) is arranged in a space on the back surface side of the display panel 30 in the housing 50, and the control unit 60 is mounted on the mounting substrate. The control unit 60 having the arithmetic operation circuit module includes a touch detecting unit 61 and a piezoelectric detecting unit 62 as illustrated in FIG. 4. The control unit 60 is connected to the first detecting conductors 103 and a plurality second detecting conductors 104 (104(1) to 104($n$)) of the touch sensor 10. In addition, n is a desired integer.

The touch detecting unit 61 outputs a capacitance change detection signal from each first detecting electrode 103. The touch detecting unit 61 receives a capacitance change detection signal which has been coupled at the capacitance formed at an intersection of the first detecting electrode 103 and the second detecting electrode 104 and has propagated to the second detecting electrode 104. The touch detecting unit 61 calculates a value corresponding to a capacitance change amount of the intersection of the first detecting electrode 103 and the second detecting electrode 104 based on the received signal, and outputs coordinates associated with a point at which a change equal to or more than a given threshold occurs, as position coordinates of an operation position.

The press detecting unit 62 uses all of the plurality of second detecting conductors 104 as press detecting conductors, and obtains signal levels of detection signals outputted from the press detecting conductors and the first detecting conductors 103. Pressing amounts and the signal levels of the detection signals are associated and stored in a memory unit. The press detecting unit 62 reads an associated pressing amount from the memory unit based on a signal level of a detection signal to output as the pressing amount.

Figure 5:
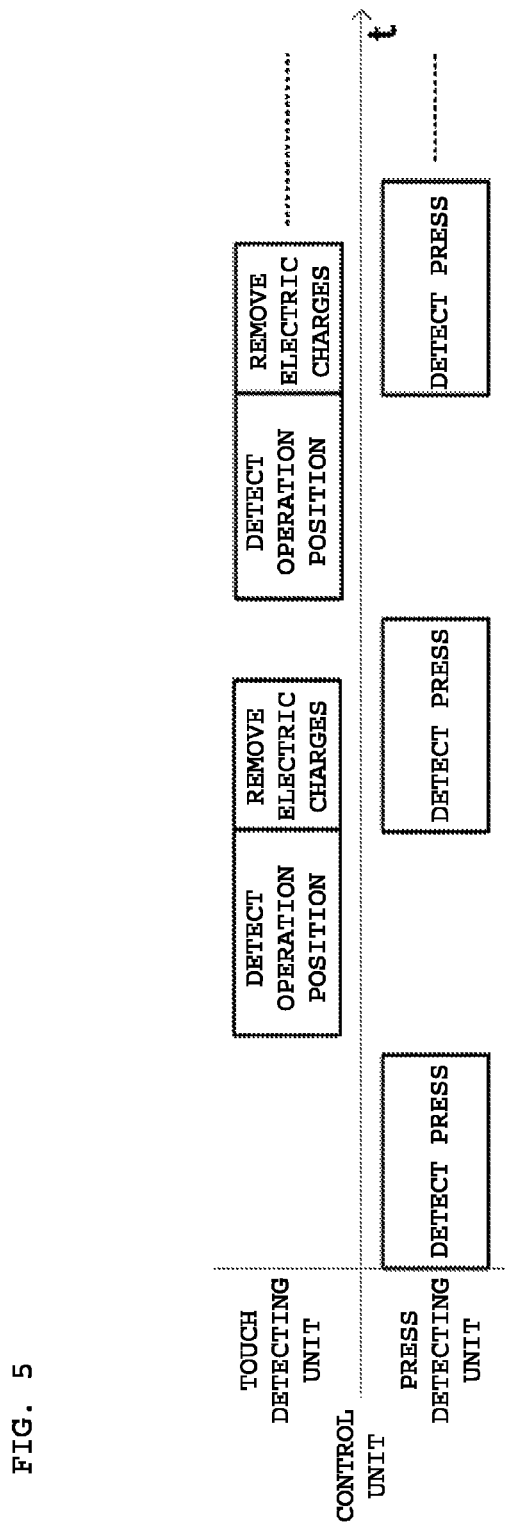
FIG. 5 is a view illustrating a transition state of processing executed in time sequences by a control unit of the touch input device according to the first embodiment of the present invention.

The control unit 60 switches between the touch detecting unit 61 and the press detecting unit 62 in time series to execute calculations. FIG. 5 is a view illustrating a transition state of processing executed in the time series by the control unit. As illustrated in FIG. 5, the control unit 60 functions as the press detecting unit 62 which uses each second detecting conductor 104 as the reference potential, and detects a press. The control unit 60 functions as the touch detecting unit 61 which uses each first detecting conductor 103 as the reference potential when detecting a press, and detects an operation position. The control unit 60 removes electric charges charged to each second detecting conductor 104 by using each second detecting conductor 104 as the reference potential when detecting an operation position, and functions as the press detecting unit 62. Subsequently, the control unit 60 sequentially switches between the press detecting unit 62 and the touch detecting unit 61 in time series to execute calculations. In addition, a switching time interval needs to be shorter than a screen update cycle, and is, for example, a 10 msec. interval (100 times per second).

By performing such switching, it is possible to use the first detecting conductors 103 and the second detecting conductors 104 to both detect a press and detect an operation position. Consequently, the press detecting sensor and the operation position detecting sensor may not be individually provided. Consequently, it is possible to make the touch sensor 10, the touch input device 11 and the display device 1 which can detect a press and detect an operation position thinner.

Figure 6:
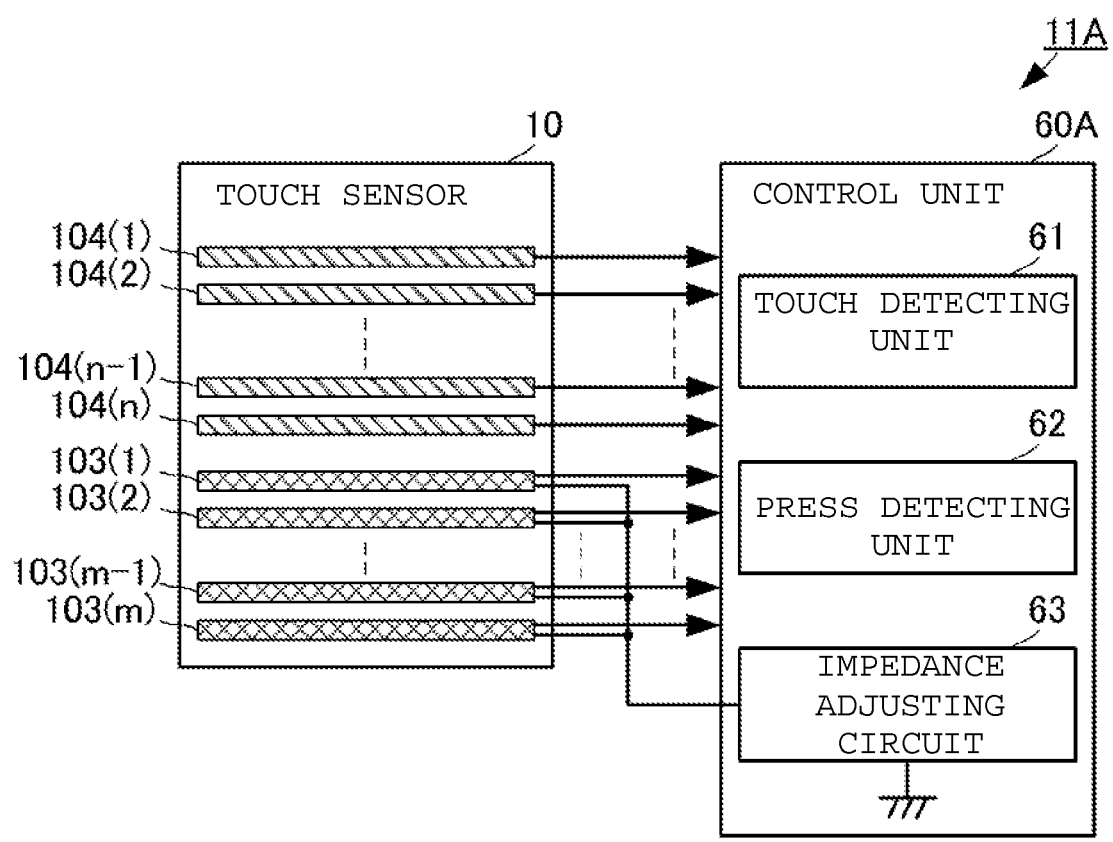
FIG. 6 is a functional block diagram of the touch input device of a display device according to a second embodiment of the present invention.

Next, a display device according to the second embodiment of the present invention will be described with reference to the drawings. FIG. 6 is a functional block diagram of the touch input device of the display device according to the second embodiment of the present invention. A touch input device 11A of the display device according to the present embodiment differs from a touch input device 11 according to the first embodiment in a configuration of a control unit 60A. Hence, only different portions will be specifically described.

The control unit 60A includes a touch detecting unit 61, a press detecting unit 62 and an impedance adjusting circuit 63. The touch detecting unit 61 and the press detecting unit 62 employ the same configurations as those of the first embodiment. That is, the control unit 60A employs a configuration where the impedance adjusting circuit 63 is added to a configuration of a control unit 60 described in the first embodiment.

The impedance adjusting circuit 63 is connected to each first detecting conductor 103. The impedance adjusting circuit 63 employs a circuit configuration where each first detecting conductor 103 is connected (grounded) to a ground potential at a specific frequency.

More specifically, the impedance adjusting circuit 63 is configured as a capacitor connected between each first detecting conductor 103 and the ground potential. The capacitance of this capacitor is set such that a serial resonance frequency of inductor components of each first detecting conductor 103 becomes a specific frequency. Such a configuration is employed, so that it is possible to set each first detecting conductor 103 as a ground potential at a specific frequency. Consequently, even when a signal of a specific frequency flows to each first detecting conductor 103, it is possible to discharge the signal of the specific frequency to the ground.

For example, the serial resonance frequency is set to a frequency of noise which influences an operation position detecting operation. In terms of a specific numerical example, the serial resonance frequency is set to several 100 Hz from 10 kHz. This frequency is a frequency which is produced from a liquid crystal display which is a display panel 30 or a power supply and becomes noise components for a touch sensor 10 and the touch input device 11A. By employing such a configuration, it is possible to discharge noise produced from the display panel 30 to the ground even when the touch sensor 10 detects an operation position in a state where the display panel 30 is driven.

In this regard, a frequency of a detection signal for detecting an operation position is about several 10 Hz at maximum. Hence, a detection signal is inputted to the control unit 60 without flowing to the ground.

Consequently, by using the configuration according to the present embodiment, it is possible to suppress influence due to noise, and reliably and accurately detect an operation position.

In addition, an example where a noise frequency of the display panel 30 is a resonance frequency has been described above. However, when a display device is attached to a wireless communication device, a frequency of a high frequency signal transmitted and received by the wireless communication device may be set as the resonance frequency. Further, by alternating arranging a unit which sets a frequency to a noise frequency which influences an operation position detecting operation and a unit which sets a frequency to a frequency of a high frequency signal transmitted and received by a wireless communication device, it is possible to provide both functions.

In addition, an example where the display panel is provided in the housing of the display device has been described in each of the above embodiments.

However, the display panel may be provided outside the housing. That is, the touch input device which has the touch panel, and the display panel may be separately provided. In such a case, the touch panel does not have translucency. In this case, materials which do not have translucency may be used for a base material, a piezoelectric film and first and second detecting conductors.

Further, an example where one sheet of the first detecting conductors 103 arranged to cover a substantially entire surface of the piezoelectric film 102 is used has been described in each of the above embodiments. However, the first detecting conductor 103 may be formed in a shape obtained by dividing the first detecting conductor 103 into multiple sheets. That is, a plurality of sheets of the first detecting conductors 103 may be arranged on the piezoelectric film 102.

DESCRIPTION OF REFERENCE SYMBOLS

1: DISPLAY DEVICE
10: TOUCH SENSOR
11,11A: TOUCH INPUT DEVICE
30: DISPLAY PANEL
40: PROTECTION FILM
50: HOUSING
60: CONTROL UNIT
101: BASE MATERIAL
102: PIEZOELECTRIC FILM
103: FIRST DETECTING CONDUCTOR
104, 104A, 104(1)~104(n): SECOND DETECTING CONDUCTOR
301: LIQUID CRYSTAL PANEL
302: TOP SURFACE POLARIZING PLATE
303: BACK SURFACE POLARIZING PLATE
304: BACKLIGHT
600: CONTROL CIRCUIT MODULE

The invention claimed is:

1. A touch input device comprising:
a piezoelectric film;
a plurality of first detecting conductors arranged on a first surface of the piezoelectric film; and
a plurality of second detecting conductors arranged adjacent a second surface opposite to the first surface of the piezoelectric film such that at least part of the plurality of second detecting conductors face the first detecting conductors; and
a control unit which receives detection signals outputted from the plurality of first detecting conductors and the plurality of second detecting conductors, uses the detection signals to detect an operation position and a press, and sets a side of each of the plurality of second detecting conductors as a reference potential upon the detection of the press.

2. The touch input device according to claim 1, wherein the piezoelectric film is uniaxially stretched polylactic acid.

3. The touch input device according to claim 2, wherein, when detecting the press, the control unit removes an electric charge charged to each of the second detecting conductors.

4. The touch input device according to claim 1, wherein, when detecting the press, the control unit removes an electric charge charged to each of the second detecting conductors.

5. The touch input device according to claim 1, wherein an elongation direction of the plurality of first detecting conductors is orthogonal to an elongation direction of the plurality of second detecting conductors.

6. The touch input device according to claim 1, further comprising a base material between the piezoelectric film and the plurality of second detecting conductors.

7. The touch input device according to claim 6, further comprising an insulating protection film covering a surface of the plurality of second detecting conductors opposite to the base material.

8. The touch input device according to claim 1, further comprising an insulating protection film covering a surface of the plurality of second detecting conductors.

9. The touch input device according to claim 1, wherein the control unit receives a capacitance change detection signal based on a capacitance formed at an intersection of the first detecting electrodes and the second detecting electrodes and that has propagated to the second detecting electrodes as the detection signal for the operation position, and the control unit calculates a value corresponding to a capacitance change amount at the intersection of the first detecting electrode and the second detecting electrode based on the received capacitance change signal, and outputs coordinates associated with a point at which a change equal to or more than a given threshold occurs, as position coordinates of the operation position.

10. The touch input device according to claim 9, wherein the control unit obtains signal levels as the detection signals outputted from the plurality of second detecting conductors and the first detecting conductors, and the control unit reads an associated pressing amount from memory based on the signal levels of the detection signals and outputs a pressing amount of the press.

11. The touch input device according to claim 10, wherein the control unit switches between detecting and determining the operation position and the press in a time series.

12. The touch input device according to claim 1, wherein the control unit obtains signal levels as the detection signals outputted from the plurality of second detecting conductors and the first detecting conductors, and the control unit reads an associated pressing amount from memory based on the signal levels of the detection signals and outputs a pressing amount of the press.

13. The touch input device according to claim 1, further comprising an impedance adjusting circuit between each of the first detecting conductors and a ground potential.

14. The touch input device according to claim 13, wherein the impedance adjusting circuit is a capacitor which connects each of the first detecting conductors and the ground potential.

15. The touch input device according to claim 14, wherein the capacitor has a capacitance whose frequency is set such that a serial resonance frequency of each of the plurality of first detecting conductors becomes a specific frequency that is discharged to the ground potential.

16. A display device comprising:
the touch input device according to claim 15; and
a display panel overlapped with the touch input device to display an image,
wherein a frequency of a signal generated by the display panel is the serial resonance frequency.

17. A wireless communication device comprising:
the touch input device according to claim 15,
wherein a frequency of a signal to be transmitted to and from the wireless communication device is the serial resonance frequency.

* * * * *